United States Patent
Fagan

(10) Patent No.: US 9,018,131 B2
(45) Date of Patent: Apr. 28, 2015

(54) CHEMICAL ACTIVATION OF CARBON VIA A GAS ATOMIZATION METHOD

(71) Applicant: Corning Incorporated, Corning, NY (US)

(72) Inventor: James Gerard Fagan, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 2 days.

(21) Appl. No.: 13/851,441

(22) Filed: Mar. 27, 2013

(65) Prior Publication Data

US 2014/0294717 A1    Oct. 2, 2014

(51) Int. Cl.
*C01B 31/12* (2006.01)
*C01B 31/08* (2006.01)

(52) U.S. Cl.
CPC .............. *C01B 31/12* (2013.01); *C01B 31/089* (2013.01)

(58) Field of Classification Search
CPC ....... C01B 31/086; C01B 31/08; B01J 20/324
USPC .............................................. 423/445 R, 460
See application file for complete search history.

(56) References Cited

U.S. PATENT DOCUMENTS

| | | | | |
|---|---|---|---|---|
| 4,082,694 | A | 4/1978 | Wennerberg et al. | 252/444 |
| 4,318,712 | A | 3/1982 | Lang et al. | 48/202 |
| 4,421,631 | A | 12/1983 | Ampaya et al. | 208/8 |
| 7,704,921 | B2 | 4/2010 | Bool, III et al. | 502/417 |
| 7,709,415 | B2 | 5/2010 | Sugo et al. | 502/427 |
| 7,771,788 | B2 | 8/2010 | Kinuta et al. | 427/212 |
| 8,124,561 | B2 | 2/2012 | Bool, III et al. | 502/417 |
| 8,318,356 | B2 | 11/2012 | Gadkaree et al. | 429/231.8 |
| 2002/0048144 | A1 | 4/2002 | Sugo et al. | 361/502 |

(Continued)

FOREIGN PATENT DOCUMENTS

| | | |
|---|---|---|
| JP | 2001-163612 | 6/2001 |
| KR | 2008 0020288 | 3/2008 |

(Continued)

OTHER PUBLICATIONS

A. Ahmadpour, et al., "The Preparation of Active Carbons from Coal by Chemical and Physical Activation", *Carbon*, 1996, vol. 34, No. 4, pp. 471-479.

(Continued)

*Primary Examiner* — Richard M Rump
(74) *Attorney, Agent, or Firm* — Michael Russell

(57) ABSTRACT

The disclosure relates to methods for forming activated carbon comprising providing a feedstock mixture comprising a carbon feedstock and at least one chemical activating agent, heating the feedstock mixture to at least the fluxing temperature of the feedstock mixture to form a feedstock melt, atomizing the feedstock melt and introducing the atomized feedstock mixture into a reactor, rapidly heating the atomized feedstock to at least the solidification temperature by introducing a hot stream into the reactor, introducing the heated feedstock mixture into a reaction vessel, and holding the heated feedstock mixture in the reaction vessel at a temperature and for a time sufficient to react the carbon feedstock with the at least one chemical activating agent to form activated carbon, wherein rapidly heating the atomized feedstock comprises heating the mixture within a time period sufficient to maintain the feedstock mixture in a substantially solid state throughout the rapid heating stage.

19 Claims, 4 Drawing Sheets

(56) References Cited

U.S. PATENT DOCUMENTS

| | | | | |
|---|---|---|---|---|
| 2005/0047061 | A1 | 3/2005 | Sugo et al. | 361/502 |
| 2005/0181941 | A1 | 8/2005 | Sugo et al. | 502/427 |
| 2008/0096018 | A1* | 4/2008 | Zhang et al. | 428/402 |
| 2010/0150814 | A1 | 6/2010 | Gadkaree et al. | 423/445 |
| 2014/0056798 | A1* | 2/2014 | Fletcher et al. | 423/445 R |

FOREIGN PATENT DOCUMENTS

| | | |
|---|---|---|
| KR | 2008 0020298 | 3/2008 |
| KR | 1051437 | 7/2011 |

OTHER PUBLICATIONS

A. Ahmadpour, et al., "The Preparation of Activated Carbon from Macadamia Nutshell by Chemical Activation", *Carbon*, 1997, vol. 35, No. 12, pp. 1723-1732.

M. Cadek, et al., "Bio-Based Materials for Supercapacitors", SGL Group—The Carbon Company, Meitingen, Germany, 2007, pp. 1-3.

M.J. Illán-Gómez, et al., "Activated Carbons from Spanish Coals. 2. Chemical Activation", *Energy & Fuels*, 1996, vol. 10, pp. 1108-1114.

O. Kadleo, et al., "Structure of Pores of Active Carbons Prepared by Water-Vapour and Zinc-Dichloride Activation", *Carbon*, 1970, vol. 8, pp. 321-331.

A.G. Pandolfo, et al., "Carbon Properties and Their Role in Supercapacitors", *Journal of Power Sources*, 2006, vol. 157, pp. 11-27.

H. Teng, et al., "Preparation of porous carbons from phenol-formaldehyde resins with Chemical and physical activation", *Carbon*, 2000, vol. 38, pp. 817-824.

S.R. Tennison, "Phenolic-resin-derived activated carbons", *Applied Catalysis A: General*, 1998, vol. 173, pp. 289-311.

O. Treusch, et al., "Basic properties of specific wood-based materials carbonised in a nitrogen atmospnere", *Wood Sci Technol*, 2004, vol. 38, pp. 323-333.

Z. Yue, et al., "Preparation of fibrous porous materials by chemical activation 1. $ZnCl_2$ activation of polymer-coated fibers", *Carbon*, 2002, vol. 40, pp. 1181-1191.

Z. Yue, et al., "Preparation of fibrous porous materials by chemical activation 2. $H_2PO_4$ activation of polymer coated fibers", *Carbon*, 2003, vol. 41, pp. 1809-1817.

PCT Application No. PCT/US2014/031401, filed Mar. 21, 2014, PCT Search Report.

* cited by examiner

CHEMICAL ACTIVATION OF CARBON VIA A GAS ATOMIZATION METHOD

FIELD OF THE DISCLOSURE

The present disclosure relates generally to methods for forming activated carbon, and more particularly to chemical activation of carbon via a gas atomization method.

BACKGROUND

Energy storage devices such as ultracapacitors may be used in a variety of applications such as where a discrete power pulse is required. Example applications range from cell phones to hybrid vehicles. Ultracapacitors have emerged as an alternative to batteries in applications that require high power, long shelf life, and/or long cycle life. Ultracapacitors typically comprise a porous separator and an organic electrolyte sandwiched between a pair of carbon-based electrodes. The energy storage is achieved by separating and storing electrical charge in the electrochemical double layers that are created at the interfaces between the electrodes and the electrolyte. Important characteristics of these devices are the energy density and power density that they can provide, which are both largely determined by the properties of the carbon that is incorporated into the electrodes.

Carbon-based electrodes suitable for incorporation into energy storage devices are known. Activated carbon is widely used as a porous material in ultracapacitors due to its large surface area, electronic conductivity, ionic capacitance, chemical stability, and/or low cost. Activated carbon can be made from natural precursor materials, such as coals, nut shells, and biomass, or synthetic materials such as phenolic resins. With both natural and synthetic precursors, the activated carbon can be formed by carbonizing the precursor and then activating the intermediate product. The activation can comprise physical (e.g., steam or $CO_2$) or chemical activation at elevated temperatures to increase the porosity and hence the surface area of the carbon.

Both physical and chemical activation processes typically involve large thermal budgets to heat and react the carbonized material with the activating agent. In the case of chemical activation, corrosive by-products can be formed when a carbonized material is heated and reacted with a chemical activating agent such as KOH. Additionally, phase changes that may occur during the heating and reacting of the carbonized material and chemical activating agent can result in agglomeration of the mixture during processing. These drawbacks can add complexity and cost to the overall process, particularly for reactions that are carried out at elevated temperatures for extended periods of time.

Significant issues have been reported when caustics, such as KOH, are used for the chemical activation of carbon. For example, when rotary kilns are used in carbon activation, it is often required that the feedstock undergoes calcination and/or drying and/or dehydration prior to treatment at activation temperatures. Agglomeration tends to pose significant issues, such as increased process complexity and/or cost, in continuous processes, for instance, processes employing screw kneaders. As a means to avoid agglomeration issues, other technologies such as roller hearths, have been employed wherein trays are loaded with activation mix material and passed through a multiple zone tunnel furnace. Such furnaces may be costly in operation and may have limited throughput since only one tray level is passed through the furnace at a time. The furnace width is also limiting factor for roller hearths on throughput since roller length spanning across the furnace is limited by material availability and strength at service temperature.

Accordingly, it would be advantageous to provide activated carbon materials and processes for forming activated carbon materials using a more economical chemical activation route while also minimizing the technical issues of corrosion and/or agglomeration. The resulting activated carbon materials can possess a high surface area to volume ratio and can be used to form carbon-based electrodes that enable efficient, long-life and high energy density devices.

SUMMARY

The disclosure relates to methods for forming activated carbon comprising melting a feedstock mixture to form a flowable and/or substantially low viscosity fluid, atomizing the feedstock melt, and rapidly heating the atomized feedstock to form substantially solid feedstock particles. The feedstock particles can then be processed using any of various conventional activation processes, while minimizing or eliminating various processing drawbacks, such as corrosion of equipment, potential combustion, and/or increased process complexity or expense.

In various embodiments, the methods comprise providing a feedstock mixture comprising a carbon feedstock and at least one chemical activating agent, heating the feedstock mixture to at least the fluxing temperature of the feedstock mixture to form a feedstock melt, atomizing the feedstock melt and introducing the atomized feedstock mixture into a reactor, rapidly heating the atomized feedstock mixture to at least the solidification temperature by introducing a hot stream into the reactor, introducing the heated feedstock mixture into a reaction vessel, and holding the heated feedstock mixture in the reaction vessel at a temperature and for a time sufficient to react the carbon feedstock with the at least one chemical activating agent to form activated carbon. According to various embodiments, rapidly heating the atomized feedstock comprises heating the mixture within a time period sufficient to maintain the atomized feedstock in a substantially solid state throughout the heating stage.

In certain embodiments, the mass ratio of chemical activating agent to carbon feedstock in the feedstock mixture ranges from about 0.5:1 to about 5:1. The reactor may, in various embodiments, be a gas atomization reactor, for example, such that the feedstock mixture is rapidly converted to a dry or substantially dry state upon introduction into the reactor. In certain embodiments, the atomized feedstock is atomized within a hot gas stream and introduced into the reactor. In some non-limiting embodiments, the chemical activating agent comprises KOH and the hot stream comprises steam or a mixture of gases such as steam and nitrogen.

Additional features and advantages of will be set forth in the detailed description which follows, and in part will be readily apparent to those skilled in the art from that description, including the detailed description which follows, the claims, as well as the appended drawings.

It is to be understood that both the foregoing general description and the following detailed description present various embodiments, and are intended to provide an overview or framework for understanding the nature and character of the disclosure as it is claimed. The accompanying drawings are included to provide a further understanding, and are incorporated into and constitute a part of this specification. The drawings illustrate various embodiments and together with the description serve to explain the principles and operations of the disclosure.

BRIEF DESCRIPTION OF THE DRAWINGS

The following detailed description can be best understood when read in conjunction with the following drawings, where like structures are indicated with like reference numerals and in which.

DETAILED DESCRIPTION

Figure 1:
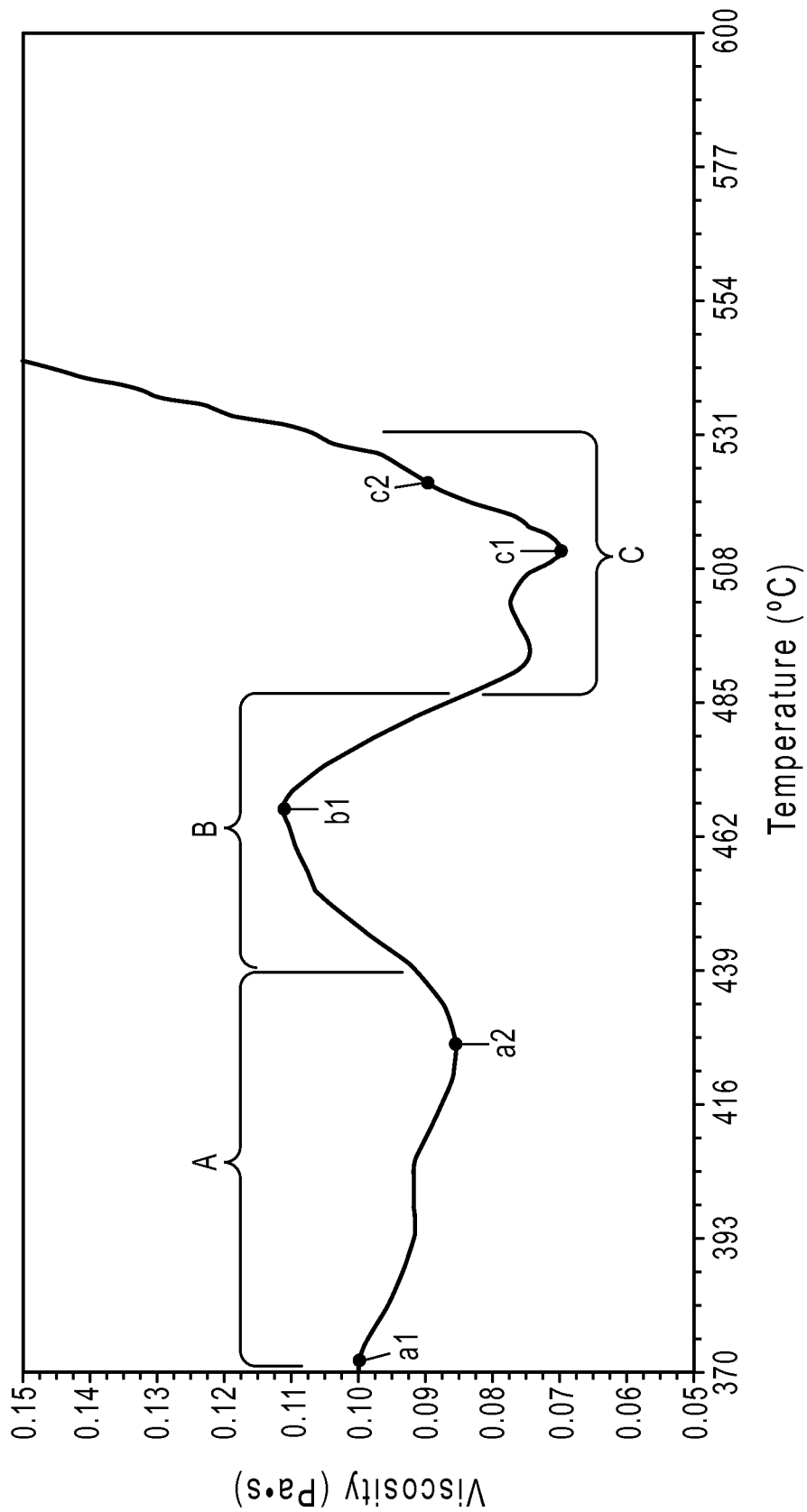
FIG. 1 is a graphical illustration of the cone and plate viscosity curve of a carbon/KOH mixture (1:2 weight ratio) as a function of temperature.

Disclosed herein is a method for making activated carbon comprising providing a feedstock mixture comprising a carbon feedstock and chemical activating agent, heating the feedstock mixture to at least the fluxing temperature of the feedstock mixture to form a feedstock melt, atomizing the feedstock melt and introducing the atomized feedstock mixture into a reactor, rapidly heating the atomized feedstock mixture to at least the solidification temperature by introducing a hot stream (e.g., gas stream) into the reactor, introducing the heated feedstock mixture into a reaction vessel, and holding the heated feedstock mixture in the reaction vessel at a temperature and for a time sufficient to react the carbon feedstock with the chemical activating agent to form activated carbon.

As used herein, the term "solidification temperature" and variations thereof are intended to denote a temperature at which at least one liquid to solid transformation results in a substantially liquid-free, i.e., substantially solid bulk mixture, wherein the liquid to solid transformation is associated with an increase in temperature. Similarly, the term "fluxing temperature" and variations thereof are intended to denote a temperature at which at least one solid to liquid transformation results in the introduction of at least one liquid phase in the bulk mixture, wherein the solid to liquid transformation is associated with an increase in temperature.

According to various embodiments, the carbon feedstock may comprise a carbonized material such as coal or a carbonized material derived from a carbon precursor. Example carbon precursors include natural materials such as nut shells, wood, biomass, non-lignocellulosic sources, and synthetic materials, such as phenolic resins, including poly(vinyl alcohol) and (poly)acrylonitrile. For instance, the carbon precursor can be comprise edible grains such as wheat flour, walnut flour, corn flour, corn starch, corn meal, rice flour, and potato flour. Other carbon precursors include coconut husks, beets, millet, soybean, barley, and cotton. The carbon precursor can be derived from a crop or plant that may or may not be genetically-engineered.

Further exemplary carbon precursor materials and associated methods of forming carbon feedstock are disclosed in commonly-owned U.S. patent application Ser. Nos. 12/335,044, 12/335,078, 12/788,478 and 12/970,073, which are incorporated herein by reference in their entireties.

Carbon precursor materials can be carbonized to form carbon feedstock by heating in an inert or reducing atmosphere. Example inert or reducing gases and gas mixtures include one or more of hydrogen, nitrogen, ammonia, helium and argon. In an example process, a carbon precursor can be heated at a temperature from about 500° C. to 950° C. (e.g., 500, 550, 600, 650, 700, 750, 800, 850, 900 or 950° C., and all ranges and subranges therebetween) for a predetermined time (e.g., 0.5, 1, 2, 4, 8 or more hours, and all ranges and subranges therebetween) and then optionally cooled. During carbonization, the carbon precursor may be reduced and decomposed to form carbon feedstock.

In various embodiments, the carbonization may be performed using a conventional furnace or by heating within a microwave reaction chamber using microwave energy. For instance, a carbon precursor can be exposed to microwave energy such that it is heated and reduced to char within a microwave reactor to form carbon feedstock that is then combined with a chemical activating agent to form a feedstock mixture. It is envisioned that a single carbon precursor material or combination of precursor materials could be used to optimize the properties of the activated carbon product.

The feedstock mixture may be prepared by combining the carbon feedstock with chemical activating agent. The chemical activating agent may, in certain embodiments, be chosen from KOH, NaOH, $H_3PO_4$, $Na_2CO_3$, KCl, NaCl, $MgCl_2$, LiOH, $AlCl_3$, $P_2O_5$, $K_2CO_3$, and/or $ZnCl_2$. According to various non-limiting embodiments, the chemical activating agent may be chosen from alkali metal salts, for instance, alkali hydroxide salts such as sodium hydroxide, lithium hydroxide, and potassium hydroxide.

The feedstock mixture may, in various embodiments, include a particulate mixture of the carbon feedstock and the chemical activating agent, i.e., a powder or granular mixture of dry or substantially dry constituents. In other embodiments, the carbon feedstock may be combined with a solution of the chemical activating agent. For example, an aqueous solution may be used, and the concentration of chemical activating agent in the solution may range from about 10 to about 90 wt %.

The carbon feedstock and the chemical activating agent may be combined in any suitable ratio to form the feedstock mixture and to bring about chemical activation of the carbon. The specific value of a suitable ratio may depend, for example, on the physical form and type of the carbon feedstock and the chemical activating agent and the concentration, if one or both are in the form of a mixture or solution. A ratio of chemical activating agent to carbon feedstock on the basis of dry material weight can range, for example, from about 0.5:1 to about 5:1. For example, the ratio can range from about 1:1 to about 4:1 or from about 2:1 to about 3:1, including all ranges and subranges therebetween. In certain embodiments, the mass ratio of chemical activating agent to carbon feedstock may be about 1:1, 2:1, 3:1, 4:1, or 5:1, including all ranges and subranges therebetween. According to other embodiments, the mass ratio of chemical activating agent to carbon feedstock may be less than about 12:1, for instance, less than about 11:1, less than about 10:1, or less than about 8:1, including all ranges and subranges therebetween.

It is known that certain alkali chemical activating agents may be mixed with carbonaceous material as a means for catalyzing gasification reactions, for example, as disclosed in European Patent No. 0 007 247. However, it is noted that the amount of chemical activating agent suitable for catalyzing such reactions is not sufficient for the chemical activation of carbon as disclosed herein.

The feedstock mixture suitable for activation may optionally be further prepared by milling or grinding the mixture. For example, prior to mixing, the carbon feedstock and/or the chemical activating agent may be separately milled and then mixed together. In other embodiments, the feedstock mixture may be simultaneously milled during mixing of the carbon feedstock and chemical activating agent. According to further embodiments, the feedstock mixture may be milled after the carbon feedstock and chemical activating agent are mixed together. In yet further embodiments, the feedstock mixture is not milled or ground before heating.

Optional granulation methods may involve mixing the carbon feedstock with the chemical activating agent, optionally with heating, by way of roll compaction, drum pelletization, vacuum drying, freeze drying, and/or any other means suitable for mixing and/or granulating the feedstock mixture. Additionally, granulation may be accomplished using binder additives such as carbowax, a paraffin wax which may decompose with little or no residue contamination of the activated carbon. Use of such binders may also be employed in granulation methods including, but not limited to, pelletizing via roll compaction, drum pelletizing, and/or extrusion mixing and/or grating.

By way of non-limiting example, the feedstock mixture and/or carbon feedstock may be milled to an average particle size of less than about 100 microns, for instance, less than about 100, 50, 25, 10, or 5 microns, and all ranges and subranges therebetween. In various embodiments, the feedstock mixture can have an average particle size of less than about 5 microns, such as less than about 4, 3, 2, or 1 microns, and all ranges and subranges therebetween. In further embodiments, the particle size of the carbon feedstock mixture may range from about 0.5 to about 25 microns, such as from about 0.5 to about 5 microns.

According to various embodiments of the disclosure, the feedstock mixture is heated to at least its fluxing temperature in order to produce a feedstock melt by bringing about at least one solid to liquid transformation. By way of non-limiting example, the feedstock mixture may be heated during and/or after mixing and/or optionally milling the mixture. For instance, the carbon feedstock and chemical activating agent may be mixed in a reactor melt vessel and heated to the desired temperature during mixing. Optionally, an agitator can be used in conjunction with the reactor melt vessel to minimize foaming in the vessel. The use of air impingement, optionally in conjunction with an agitator, can also minimize foaming. In certain embodiments, the feedstock mixture is heated in a crucible using radiant, induction, resistance, microwave, or dielectric (RF) heating. The crucible may be formed from a material resistant to corrosion by the chemical activating agent, such as silicon carbide (SiC). In other embodiments, the feedstock mixture may be melted by way of vacuum induction.

The feedstock mixture may be heated to any temperature at or above the fluxing temperature. For instance, the feedstock may be heated to a temperature ranging from about 75° C. to about 500° C., such as from about 100° C. to about 450° C., from about 200° C. to about 400° C., or from about 250° C. to about 350° C., including all ranges and subranges therebetween. According to various embodiments, the feedstock mixture may be heated to a temperature of at least about 90° C., at least about 100° C., at least about 120° C., at least about 150° C., at least about 200° C., or less than about 500° C., less than about 400° C., or less than about 300° C., including all ranges and subranges therebetween. By way of non-limiting examples, the feedstock mixture may be heated to a temperature ranging from about 300° C. to about 500° C., such as from about 350° C. to about 450° C., or from about 375° C. to about 425° C., including all ranges and subranges therebetween.

In certain embodiments of the disclosure, the feedstock mixture is heated to a temperature sufficient to produce a low viscosity feedstock melt, which is able, for example, to flow through an atomization nozzle. Referring to FIG. 1, which is a graphical illustration of the cone and plate viscosity curve of a KOH/carbon mixture (2:1 ratio) as a function of temperature, it can be appreciated that various temperature ranges may be useful for producing low viscosity feedstock melts according to embodiments of the disclosure. It is to be understood that the experimental data presented in FIG. 1 is provided solely for exemplary purposes and is not intended to limit or otherwise define the scope of the instant disclosure. It is also to be understood that the experimental values discussed below may vary depending on various process factors including, but not limited to, the type and amount of chemical activating agent employed.

For example, in the illustrated embodiment, heating within Region A, at a temperature ranging from about 370° C. to about 430° C., yields a low viscosity feedstock melt with a viscosity of about 85 centiPoise (cP) at point a2 (approx. 425° C.) and a viscosity of about 100 cP at point a1 (approx. 370° C.). Without wishing to be bound by theory, it is believed that in Region B, one or more reactions involving one or more components of the feedstock mixture may result in a slight increase of the viscosity of the mixture, up to about 115 cP at point b1 (approx. 460° C.). Heating in Region C, at a temperature ranging from about 485° C. to about 530° C., may result in a lower viscosity feedstock melt, with a viscosity, for instance, of about 70 cP at point c1 (approx. 510° C.). However, at some point the increased heating will cause the viscosity of the feedstock melt to rise exponentially with increasing temperature, for example, at point c2 (approx. 525° C.).

Thus, according to various embodiments, the feedstock melt may have a viscosity of less than about 125 centipoise (cP), such as less than about 100 cP, less than about 90 cP, less than about 80 cP, or less than about 70 cP, including all ranges and subranges therebetween. According to other embodiments, the feedstock melt may have a viscosity ranging from about 50 cP to about 125 cP, such as from about 70 cP to about 110 cP, or from about 80 cp to about 100 cP, including all ranges and subranges therebetween.

Subsequent to heating, the feedstock melt is atomized and introduced into a reactor, in which it is rapidly heated by contact with a stream of hot gas. Atomization may be carried out using any process conventionally known in the art, for example, by flowing the feedstock melt through an atomizing nozzle. In various embodiments, the atomizing nozzle is formed from a material resistant to corrosion by the chemical activating agent, such as silicon carbide (SiC). The atomizer may function by any means known in the art, such as, for example, ultrasonic vibration and air compression. The atomized feedstock may be a suspension of solid particles, substantially solid particles, or fine liquid droplets dispersed in a gas.

The gas atomization process may, in certain embodiments, produce an atomized feedstock powder having an average particle size ranging from one micron to hundreds of microns, for instance, from about 10 microns to about 500 microns, at a cooling rate of about $10^3$ to $10^{4o}$ C./sec. The atomized feedstock can then be handled pneumatically or by any other suitable means. While an atomization nozzle can simultaneously atomize and introduce the feedstock mixture into the reactor, it is to be noted that other configurations, wherein the atomization and conveyance into the reactor are carried out separately, are envisioned and within the scope of the instant disclosure.

Before, during and/or after atomization and introduction of the feedstock into the reactor, a stream of hot gas is also introduced into the reactor. In certain embodiments, the reactor is a gas atomization reactor. In other embodiments, the reactor is configured such that the atomized feedstock particles are introduced into the reactor within the flow of the hot stream. In some embodiments, the feedstock melt may be converted to substantially solid particles during atomization, e.g., due to the dispersion of the melt into the air and/or other gas present in the reactor. According to other embodiments, the feedstock melt may be converted to substantially solid particles subsequent to or during atomization when brought into contact with the hot stream. In further embodiments, the feedstock melt may be converted to substantially solid particles subsequent to or during atomization when brought into contact with a surface of the reactor.

Figure 2A:
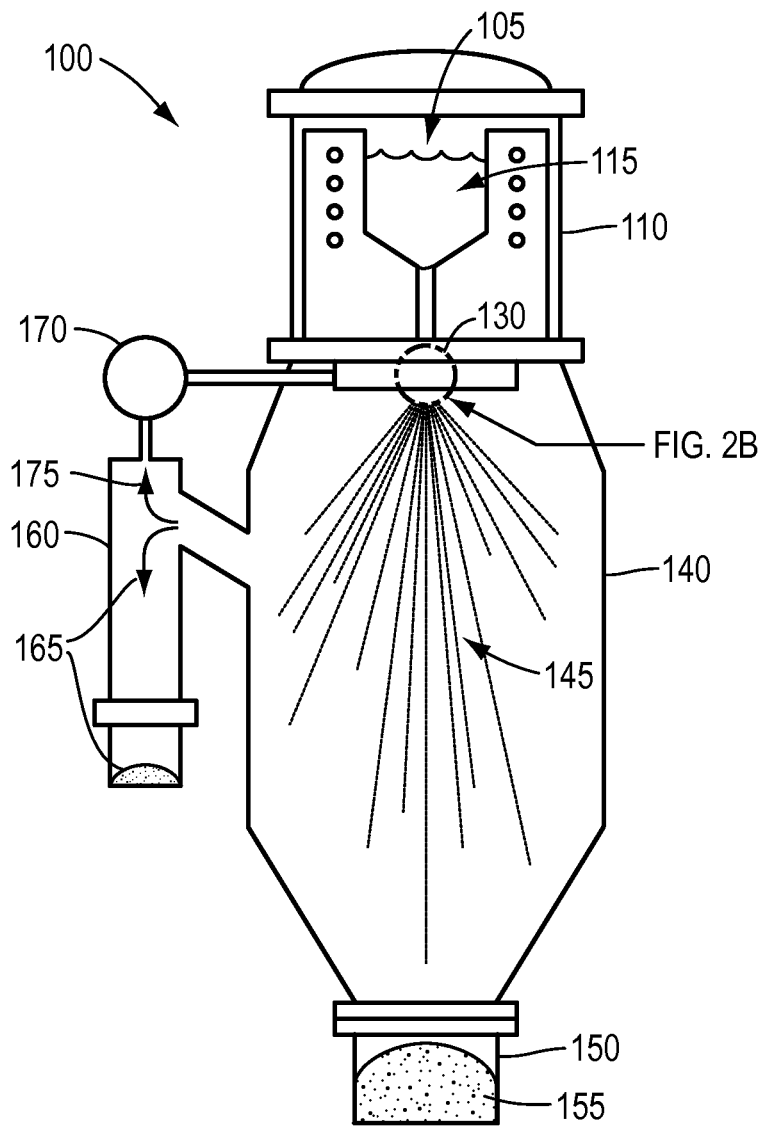
FIG. 2A-2B is a schematic illustration of a gas atomization system suitable for use in accordance with various embodiments of the disclosure.

By way of non-limiting example, the atomized feedstock and hot gas may be introduced at the top of the reactor and the feedstock mixture particles may be entrained in the hot gas stream and transported from the top of the reactor to the bottom of the reactor. Such a non-limiting configuration is illustrated in FIG. 2A. In the exemplified gas atomization system 100, a reaction vessel 110 is used to heat a feedstock mixture 105 to form a feedstock melt 115, which is introduced into a gas atomization reactor 140 by way of a nozzle configuration 130. The nozzle configuration 130 is illustrated in more detail in FIG. 2B. In particular, an atomization nozzle 120 is used to atomize the feedstock melt 115 to produce an atomized feedstock 125 and introduce it into the reactor 140. Simultaneously, a hot gas stream 135 is also introduced into the reactor. In the illustrated embodiment, the hot stream is introduced on either side of the atomization nozzle, such that the atomized feed is introduced within the hot stream. Other nozzle configurations can be readily envisioned by one skilled in the art and are intended to be part of the instant disclosure.

The atomized feedstock 125 and hot stream 135 combine in the reactor to form a heated feedstock 145, which is now a dry or substantially dry powder. A collection vessel 150 may be used to collect the heated and atomized feedstock particles 155. Although not depicted in FIG. 2A, agitation may, in certain embodiments, be applied to the collection vessel 150, for example, by way of mechanical agitators, fluidization nozzles, and other like means.

Figure 2B:
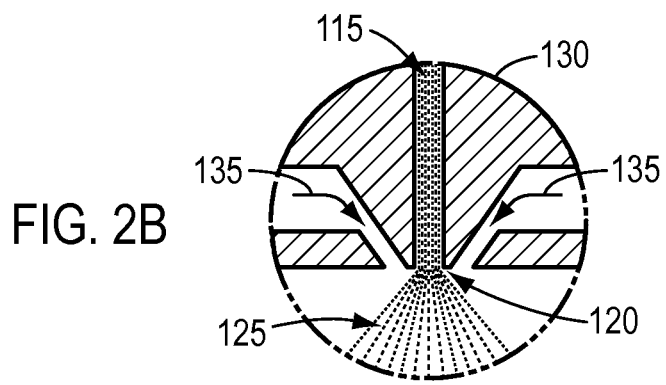

The collected feedstock particles are then introduced into a reaction vessel where they may be held at a desired temperature and for a desired time. A recycle vessel or loop 160 may optionally be employed to recycle finely atomized particles 165 and/or the gas stream 175. The recycled gas stream can optionally be introduced back into the reactor via a pump 170. The embodiment illustrated in FIGS. 2A and 2B are exemplary only and not intended to be limiting in any way of the potential reactor configurations within the scope of the instant disclosure.

In certain embodiments, the feedstock mixture may be introduced into the reactor at a feed rate ranging from about 0.1 kg/min to about 100 kg/min. The feed rate may vary depending on the reactor size, nature of the feedstock, granule particle size, and/or velocity of the entrained stream. It is within the ability of one skilled in the art to select the feed rate appropriate for the desired operation and result. According to other non-limiting embodiments, the hot stream may comprise steam. For instance, the hot stream may be chosen from steam, air, carbon dioxide, nitrogen, argon, and mixtures thereof.

It will be appreciated that alkali metals, for example, sodium and potassium, may spontaneously combust upon exposure to air. Formation of alkali metals can be prevented or alleviated by using steam as the hot stream in the reactor. The water vapor will scavenge alkali atoms and react to form non-combustible alkali oxides or hydroxides. Thus, in certain embodiments, during the rapid heating step, steam or water vapor entrained in an inert gas, such as nitrogen or argon, can be introduced into the reactor.

According to various embodiments, the feedstock mixture is rapidly heated by contact with the hot gas stream. The velocity of the hot gas may also vary depending on the reactor size, nature of the feedstock, granule particle size, and/or feedstock feed rate. The stream velocity may range for example, from about 0.5 m/sec to about 2000 m/sec, such as from about 1 m/sec to about 1000 m/sec, from about 2 m/sec to about 100 m/sec, from about 5 m/sec to about 20 m/sec, or from about 5 m/sec to about 15 m/sec, including all ranges and subranges therebetween. It is within the ability of one skilled in the art to select the stream velocity appropriate for the desired operation and result. The temperature of the hot gas stream may range, for instance, from about 600° C. to about 900° C., such as from about 650° C. to about 800° C., or from about 680° C. to about 750° C., including all ranges and subranges therebetween. In other embodiments, the reactor may be heated by an additional heating means, for example, by way of resistance, microwave or dielectric (RF) heating.

According to various embodiments, the term "rapid heating" is used to denote heating of the atomized feedstock to at least its solidification temperature within a period of time sufficient to maintain the atomized feedstock in a substantially solid state. In some instances, the atomized feedstock may be introduced into the reactor in a partially liquid substantially liquid state. In such instances, "rapid heating" may be used to denote that the atomized feedstock particles rapidly and substantially solidify subsequent to and/or during atomization and/or when brought into contact with the hot stream. Without wishing to be bound by theory, it is believed that rapid heating of the atomized feedstock as disclosed herein may minimize or eliminate the presence of liquid chemical activating agent in subsequent processing steps, thereby reducing the associated hazards, such as corrosion and/or combustion.

As used herein, the term "substantially solid state" and variations thereof are intended to denote that the atomized feedstock is comprised essentially or totally of solid particles. For instance, the atomized feedstock may comprise 100% by weight of solid particles or, in other embodiments, the atomized feedstock may comprise greater than about 99.9% by weight of solid particles, such as greater than about 99.5%, greater than about 99%, greater than about 98%, greater than about 97%, greater than about 96%, or greater than about 95% by weight of solid particles.

Figure 3:
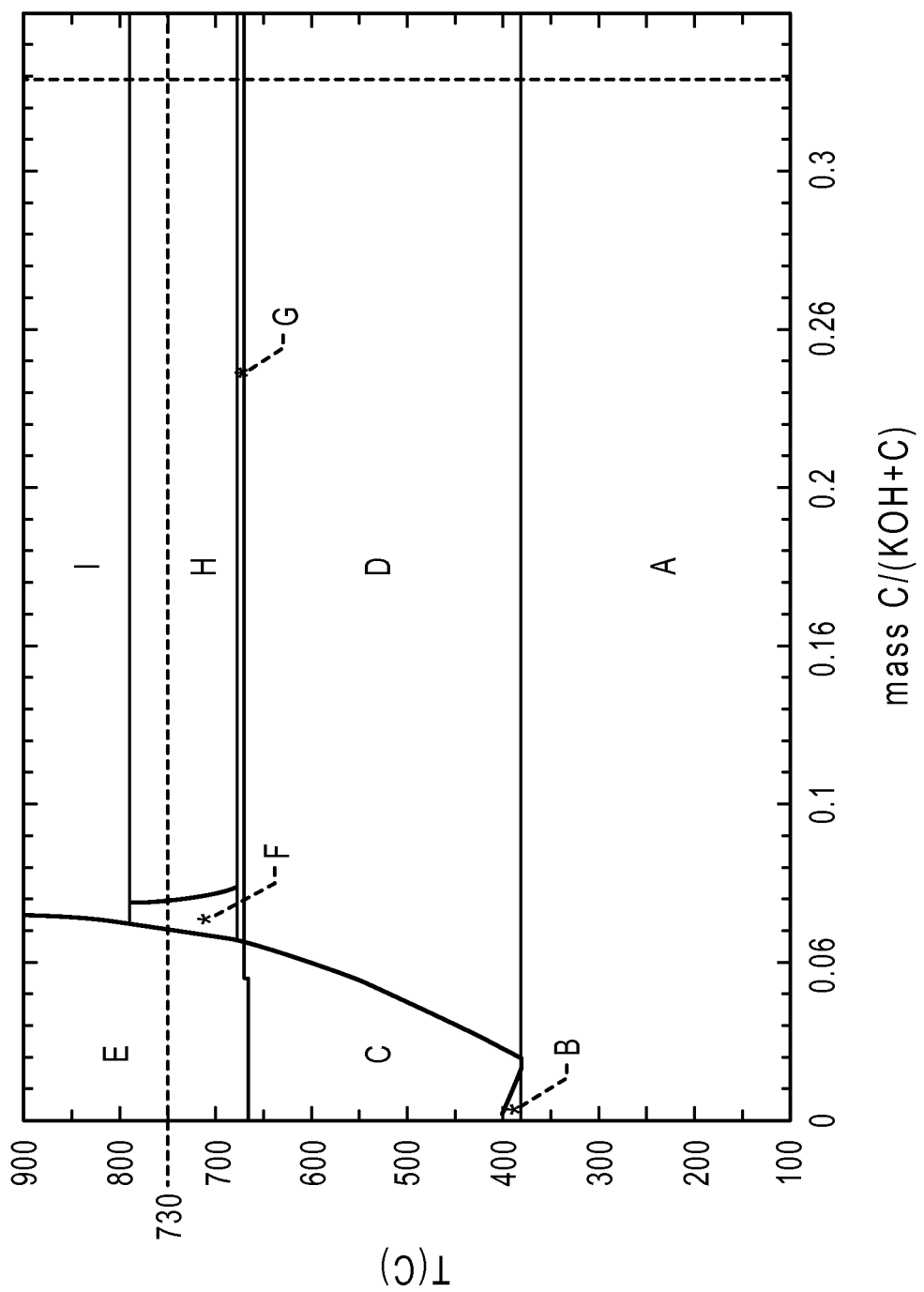
FIG. 3 is an estimated equilibrium phase diagram for KOH and carbon in a closed system.

Referring to FIG. 3, which illustrates an estimated equilibrium phase diagram for KOH and carbon in a closed system, it is noted that the exemplified feedstock mixture undergoes several phase changes at different theoretical temperatures and carbon/KOH ratios. The different phases are depicted in FIG. 3, with reference to Regions A-I described below in Table I:

TABLE I

Theoretical Regions A-I

| Region | Theoretical Temperature (approximate) | Phases |
|---|---|---|
| A | 0-375° C. | C(s) + KOH(s) |
| B | 375-400° C. | liq soln + K(l) + KOH(s) |
| C | 400-660° C. | liq soln + K(l) |
| D | 375-660° C. | liq soln + K(l) + C(s) |
| E | 660-900° C. | liq soln |
| F | 680-800° C. | liq soln + $K_2CO_3$(s) |
| G | 660-680° C. | liq soln + C(s) |
| H | 680-800° C. | C(s) + $K_2CO_3$(s) |
| I | 800-900° C. | liq soln + C(s) |

For instance, in the case of KOH, for the illustrated compositions in theoretical equilibrium, the closed system exists as two solid phases (Region A) up to approximately 375° C. Above about 375° C., which is the approximate fluxing temperature, KOH melts and a plurality of liquid phases are prominent in each of Regions B, C, and D. While some activation may occur at lower temperatures, typically, higher rates of carbon activation occur at theoretical conditions within Region H of FIG. 1 (i.e., for compositions having a C/(C+KOH) mass ratio of at least about 0.08 and at a temperature ranging from about 680° C. to about 800° C.).

According to various embodiments herein, when KOH is the chemical activating agent, the atomized feedstock is rapidly heated to at least about the theoretical solidification temperature (approximately 680° C.) in a time period sufficient to maintain the feedstock mixture in a substantially solid state. In other words, the atomized feedstock is rapidly heated through the theoretical KOH fluxing temperature range (Regions D and G, approximately 375-680° C.), in a time period sufficient so as to avoid the formation of a liquid phase. According to various embodiments, the time period may be less than about 10 seconds, for instance, less than about 5 seconds, less than about 1 second, less than about 0.5 seconds, or less than about 0.1 seconds. In other embodiments, the rapid heating of the atomized feedstock may occur within milliseconds, for example, the time period may range from about 0.01 to about 0.09 seconds.

The intersecting dashed lines in FIG. 3 serve to illustrate an exemplary set of process parameters, i.e., T=730° C. and C/(C+KOH)=0.33 (or KOH:C=2:1), which may be employed in the methods disclosed herein and are not intended to be limiting in any way. It is to be understood that the fluxing and solidification temperatures may vary depending on the chemical activating agent or mixture of agents used. It is within the ability of one skilled in the art to identify these temperatures for any feedstock mixture as defined herein.

It will also be understood by those skilled in the art that the methods and processes disclosed herein may, in various embodiments, function under non-equilibrium conditions. In such cases, it is noted that the actual or observed fluxing and/or solidification temperatures may vary from those predicted by the model in FIG. 3. For instance, as indicated in Table II below, the experimentally observed values for the KOH/carbon system may be lower than those predicted by the theoretical model. The experimental data provided below is for exemplary purposes only and is not intended to limit or otherwise define the scope of the instant disclosure. It is within the ability of those skilled in the art to obtain similar experimental values for other activating agents disclosed herein and mixtures of such activating agents.

TABLE II

Experimental Regions A-G

| Region | Experimental Temperature (approximate) | Observed Mixture State | Potential Reactions |
|---|---|---|---|
| A | 0-120° C. | Solid | Heating |
| B | 120-150° C. | Solid to liquid | KOH•($xH_2O$)(s)→KOH(l) + $H_2O$(g) |
| C | 150-200° C. | Liquid | KOH•($xH_2O$)(s)→KOH(l) + $H_2O$(g) |
| D | 200-400° C. | Low viscosity liquid | 2KOH(l)→$K_2O$(s) + $H_2O$(g) |
| E | 400-500° C. | Thick viscous slurry | 6KOH(l) + C(s) → 2K(s) + $3H_2$(g) + $2K_2CO_3$(s) |
| F | 500-600° C. | Solid | 6KOH(l) + C(s) → 2K(s) + $3H_2$(g) + $2K_2CO_3$(s) |
| G | 600-750° C. | Solid | $K_2CO_3$(s) → $K_2O$(s) + $CO_2$(g) |

As illustrated in Table II above, the observed experimental fluxing temperature of a KOH/carbon system can be as low as 120° C., at which point the KOH begins melting or undergoing a phase transformation from solid to liquid. Similarly, the solidification temperature of the KOH/carbon system can be as low as 500° C., at which point the feedstock mixture undergoes at least one liquid to solid transformation which results in a substantially liquid-free, i.e., substantially solid bulk mixture. Activation may likewise occur at temperatures lower than theoretical values, such as greater than about 500°, or greater than about 600° C. According to various embodiments herein, when KOH is the chemical activating agent, the atomized feedstock is rapidly heated to at least about the experimental solidification temperature (approximately 500° C.) in a time period sufficient to maintain the atomized feedstock in a substantially solid state. In other words, the atomized feedstock is rapidly heated through the observed KOH fluxing temperature range (Regions B-E, approximately 120-500° C.), in a time period sufficient so as to avoid the solid-liquid transformation and the formation of a liquid phase.

Without wishing to be bound by theory, it is believed that a sufficiently short residence time in the fluxing temperature range will retain the feedstock mixture in a substantially dry, i.e., substantially solid state throughout the heating stage. For example, the rapid heating may avoid the regions in which the activating agent, such as KOH, melts or undergoes a phase transition from solid to liquid. In the case of KOH as activating agent, the feedstock mixture may be optionally pre-heated up to approximately 375° C. (the theoretical fluxing temperature) and rapidly heated up to at least about 680° C. (the theoretical solidification temperature), followed by a holding time at a temperature sufficient to activate the carbon, as discussed herein. In other embodiments, the feedstock mixture may be optionally pre-heated up to approximately 120° C. (the experimental fluxing temperature) and rapidly heated up to at least about 500° C. (the experimental solidification temperature), followed by a holding time at a temperature sufficient to activate the carbon, as discussed herein.

A chemical activating agent such as KOH (and its related species, such as K, $K_2O$, or $K_2CO_3$) can interact and react with carbon such that the potassium ion is intercalated into the carbon structure and potassium carbonate is formed. The reaction kinetics for both of these processes is believed to increase at elevated temperatures, which can lead to a higher rate of activation. As used herein, the term "activation" and variations thereof refer to a process whereby the surface area of carbon is increased such as through the formation of pores within the carbon.

While the carbon in the feedstock mixture may become activated to some degree during the rapid heating stage, generally this stage is not of a sufficient duration to achieve an adequate level of activation. Thus, subsequent to the rapid heating stage, the heated feedstock mixture is introduced into a reaction vessel, where it is held at a temperature and for a time sufficient to react the carbon feedstock with the chemical activating agent to form activated carbon. According to various embodiments, the feedstock is held for a time ranging from about 5 minutes to about 6 hours, for instance, from about 5 minutes to about 1 hour, or from about 10 minutes to about 40 minutes, including all ranges and subranges therebetween. The temperature in the reaction vessel may range, for example, from about 600° C. to about 900° C., such as from about 700° C. to about 900° C., or from about 680° C. to about 800° C., including all ranges and subranges therebetween.

The reaction vessel may be chosen, for example, from fluid bed reactors, rotary kiln reactors, tunnel kiln reactors, crucibles, microwave reaction chambers, or any other reaction vessel suitable for heating and maintaining the feedstock at the desired temperature for the desired period of time. Such vessels can operate in batch, continuous, or semi-continuous modes. In at least one embodiment, the reaction vessel operates in continuous mode, which may provide certain cost and/or production advantages. Because the feedstock mixture is in a substantially solid state, it is believed that the potential for agglomeration will be significantly decreased, thereby impacting material flowability to a much smaller degree versus other conventional processes.

Microwave heating can also be employed to heat the reaction vessel. A microwave generator can produce microwaves having a wavelength from 1 mm to 1 m (frequencies ranging from 300 MHz to 300 GHz), though particular example microwave frequencies used to form activated carbon include 915 MHz, 2.45 GHz, and microwave frequencies within the C-band (4-8 GHz). Within a microwave reaction chamber, microwave energy can be used to heat a feedstock mixture to a predetermined temperature via a predetermined thermal profile.

In the case of microwave heating, batch processes can include loading the feedstock mixture into a crucible that is introduced into the microwave reaction chamber. Suitable crucibles include those that are compatible with microwave processing and resistant to alkali corrosion. Exemplary crucibles can include metallic (e.g., nickel) crucibles, silicon carbide crucibles or silicon carbide-coated crucibles such as silicon carbide-coated mullite. Continuous feed processes, may include, for example, fluid bed, rotary kiln, tunnel kiln, screw-fed, or rotary-fed operations. Carbon material in the form of a feedstock mixture can also be activated in a semi-continuous process where crucibles of the feedstock mixture are conveyed through a microwave reactor during the acts of heating and reacting.

As the activated carbon exits the reaction vessel, it can be held in a quench tank where it is cooled to a desired temperature. For instance, the activated carbon may be quenched using a water bath or other liquid or gaseous material. An additional benefit to quenching with water may include potential neutralization of unreacted alkali metals to minimize potential corrosion and/or combustion hazards. A rotary cooling tube or cooling screw may also be used prior to the quench tank.

After activation and quenching, the activated carbon can be optionally ground to a desired particle size and then washed in order to remove residual amounts of carbon, retained chemical activating agents, and any chemical by-products derived from reactions involving the chemical activating agent. As noted above, the activated carbon can be quenched by rinsing with water prior to grinding and/or washing. The acts of quenching and washing can, in some embodiments, be combined.

The activated carbon may be washed and/or filtered in a batch, continuous, or semi-continuous manner and may take place at ambient temperature and pressure. For example, washing may comprise rinsing the activated carbon with water, then rinsing with an acid solution, and finally rinsing again with water. Such a washing process can reduce residual alkali content in the carbon to less than about 200 ppm (0.02 wt %). In certain embodiments, after quenching and/or rinsing, the activated carbon is substantially free of the chemical activating agent, its ions and counterions, and/or its reaction products with the carbon. For instance, in the case of KOH as the chemical activating agent, the activated carbon is substantially free of KOH, $K^+$, $OH^-$, and $K_2CO_3$. Accordingly, it is believed that the chemical activating agent intercalates into the carbon and is then removed, leaving behind pores, i.e., increasing the surface area and activating the carbonaceous feedstock.

The activated carbon can comprise micro-, meso- and/or macroscale porosity. As defined herein, microscale pores have a pore size of about 2 nm or less and ultra-microscale pores have a pore size of about 1 nm or less. Mesoscale pores have a pore size ranging from about 2 to about 50 nm. Macroscale pores have a pore size greater than about 50 nm. In one embodiment, the activated carbon comprises a majority of microscale pores.

As used herein, the term "microporous carbon" and variants thereof means an activated carbon having a majority (i.e., at least 50%) of microscale pores. A microporous, activated carbon material can comprise greater than 50% microporosity (e.g., greater than about 50, 55, 60, 65, 70, 75, 80, 85, 90 or 95% microporosity). According to certain embodiments, the activated carbon may have a total porosity of greater than about 0.2 $cm^3$/g (e.g., greater than about 0.2, 0.25, 0.3, 0.35, 0.4, 0.45, 0.5, 0.55, 0.6, 0.65 or 0.7 $cm^3$/g). The portion of the total pore volume resulting from micropores (d≤2 nm) can be about 90% or greater (e.g., at least about 90, 94, 94, 96, 98 or 99%) and the portion of the total pore volume resulting from micropores (d≤1 nm) can be about 50% or greater (e.g., at least about 50, 55, 60, 65, 70, 75, 80, 85, 90 or 95%).

Figure 4:
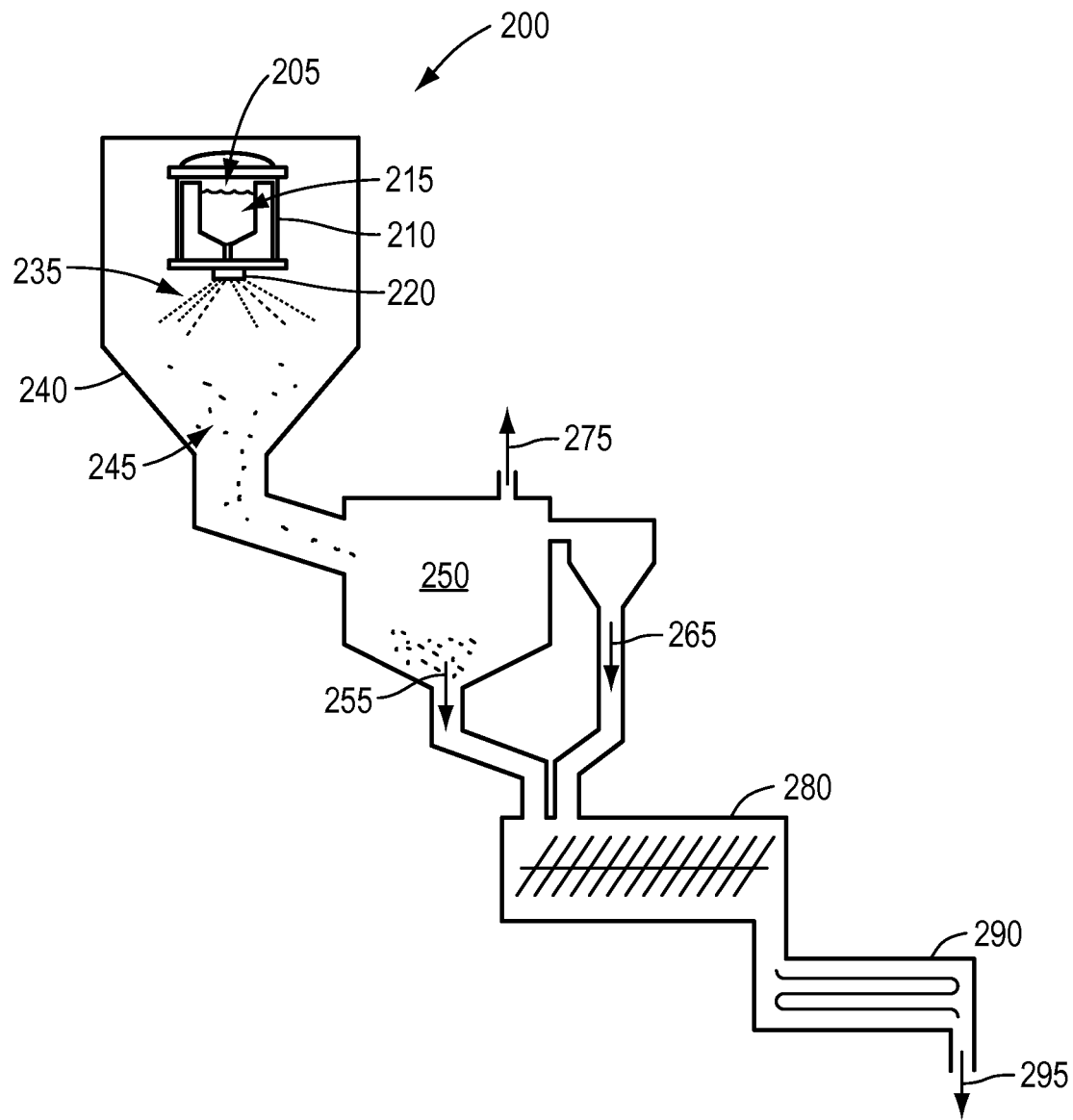
FIG. 4 is a schematic illustration of a system for preparing activated carbon according one embodiment of the disclosure.

FIG. 4 illustrates an exemplary system 200 operable for carrying out a method according to the present disclosure. In this embodiment, a feedstock mixture 205 is introduced into a reaction vessel 210, where it is heated to form a feedstock melt 215. The feedstock melt is then introduced into a reactor 240, by way of an atomizing nozzle 220. A hot gas stream 235 is also introduced into the reactor. While the reaction vessel 210 is depicted as disposed within reactor 240, it is to be understood that variations of this configuration are possible and within the scope of the disclosure. Likewise, while FIG. 4 illustrates the feedstock melt and hot gas stream being fed into the top of the reactor, it is to be understood that variations of this configuration are possible and within the scope of the disclosure.

The heated feedstock 245 may then be introduced into a cyclone 250, where the larger atomized feedstock particles 255 may be collected by way of gravity, while the finer atomized feedstock particles 265 can be separated from the recycled hot gas stream 275. The atomized feedstock particles are subsequently introduced into a reaction vessel 280, where they are held at a temperature and for a time sufficient to produce activated carbon. The activated carbon may then be introduced into a cooling chamber or quench tank 290, where it is cooled to a desired temperature. The quenched activated carbon 295 is then optionally subjected to additional processing steps such as washing and/or filtration.

According to various embodiments, the feedstock mixture 205 is heated to a temperature ranging from about 300° C. to about 400° C. in reaction vessel 210, rapidly heated to a temperature ranging from about 500° C. to about 800° C. in reactor 240, and held at a temperature ranging from about 700° C. to about 900° C. in reaction vessel 280.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a chemical activating agent" includes examples having two or more such "chemical activating agents" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present disclosure being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a carbon feedstock that comprises a carbonized material include embodiments where a carbon feedstock consists of a carbonized material and embodiments where a carbon feedstock consists essentially of a carbonized material.

It will be apparent to those skilled in the art that various modifications and variations can be made without departing from the spirit and scope of the disclosure. Since modifications combinations, sub-combinations, and variations of the disclosed embodiments incorporating the spirit and substance of the disclosure may occur to persons skilled in the art, the disclosure should be construed to include everything within the scope of the appended claims and their equivalents.

What is claimed is:

1. A method for forming activated carbon, comprising:
   providing a feedstock mixture comprising a carbon feedstock and at least one chemical activating agent;
   heating the feedstock mixture to at least the fluxing point of the feedstock mixture to form a feedstock melt;
   atomizing the feedstock melt and introducing the atomized feedstock into a reactor;
   heating the atomized feedstock within a time period of 10 seconds or less to at least the solidification temperature by introducing a hot stream into the reactor;
   introducing the heated feedstock into a reaction vessel; and
   holding the heated feedstock in the reaction vessel at a temperature and for a time sufficient to react the carbon feedstock with the at least one chemical activating agent to form activated carbon.

2. The method according to claim 1, wherein providing the feedstock mixture comprises providing a carbon feedstock and mixing the carbon feedstock with at least one chemical activating agent to produce a feedstock mixture.

3. The method according to claim 2, wherein providing the carbon feedstock comprises carbonizing at least one carbonaceous material in an inert atmosphere at a temperature ranging from about 500 to 950° C.

4. The method according to claim 1, wherein the at least one chemical activating agent is selected from the group consisting of KOH, NaOH, LiOH, $H_3PO_4$, $Na_2CO_3$, NaCl, $MgCl_2$, $AlCl_3$, $P_2O_5$, $K_2CO_3$, KCl, $ZnCl_2$, and mixtures thereof.

5. The method according to claim 1, wherein the at least one chemical activating agent is chosen from alkali hydroxide salts.

6. The method according to claim 1, wherein the mass ratio of chemical activating agent to carbon feedstock ranges from about 0.5:1 to about 5:1.

7. The method according to claim 1, wherein the feedstock mixture is a wet or dry mixture.

8. The method according to claim 1, wherein the feedstock mixture is heated to a temperature ranging from about 200° C. to about 500° C.

9. The method according to claim 1, wherein the feedstock melt is introduced into the reactor using an atomizing nozzle.

10. The method according to claim 1, wherein the reactor is a gas atomization reactor.

11. The method according to claim 10, wherein the atomized feedstock is entrained in the hot stream within the reactor.

12. The method according to claim 1, wherein the atomized feedstock has an average particle size ranging from about 10 μm to about 1000 μm.

13. The method according to claim 1, wherein the hot stream is introduced into the reactor at a rate of about 0.5 m/sec to about 2000 m/sec.

14. The method according to claim 1, wherein the hot stream comprises steam or a mixture of steam with at least one other gas chosen from nitrogen, argon, and helium.

15. The method according to claim 1, wherein heating the atomized feedstock comprises heating to a temperature of at least 500° C. in a time period of 5 seconds or less.

16. The method according to claim 1, wherein the atomized feedstock is held in the reaction vessel at a temperature ranging from about 700° C. to about 900° C. and for a time ranging from about 5 minutes to about 6 hours.

17. The method according to claim 1, further comprising at least one step chosen from cooling the activated carbon and/or rinsing the activated carbon with water.

18. A method for forming activated carbon, comprising:
providing a feedstock mixture comprising a carbon feedstock and at least one alkali hydroxide salt;
heating the feedstock mixture to at least the fluxing point of the feedstock mixture to form a feedstock melt;
atomizing the feedstock melt and introducing the atomized feedstock into a reactor;
heating the atomized feedstock to at least the solidification temperature by introducing steam into the reactor;
introducing the heated feedstock into a reaction vessel;
holding the heated feedstock in the reaction vessel at a temperature and for a time sufficient to react the carbon feedstock with the at least one alkali hydroxide salt to form activated carbon; and
cooling the activated carbon,
wherein heating the atomized feedstock comprises heating to at least 500° C. in a time period of 10 seconds or less.

19. The method according to claim 18, wherein the at least one alkali hydroxide salt is KOH.

\* \* \* \* \*